United States Patent
Ichinowatari

(10) Patent No.: US 7,319,388 B2
(45) Date of Patent: Jan. 15, 2008

(54) IMAGE PROCESSOR, ABNORMALITY REPORTING METHOD AND ABNORMALITY REPORTING PROGRAM

(75) Inventor: Yasushi Ichinowatari, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 400 days.

(21) Appl. No.: 11/043,415

(22) Filed: Jan. 27, 2005

(65) Prior Publication Data

US 2006/0080571 A1    Apr. 13, 2006

(30) Foreign Application Priority Data

Sep. 22, 2004    (JP)    ............................. 2004-275794

(51) Int. Cl.
  *G08B 21/00*    (2006.01)
(52) U.S. Cl. ........................... 340/540; 340/506; 714/4
(58) Field of Classification Search ................ 340/540, 340/506, 679, 691.6; 370/242; 714/4, 48
See application file for complete search history.

(56) References Cited

U.S. PATENT DOCUMENTS 7,002,905 B1 *    2/2006    Khouri et al. .............. 370/216

2003/0048304 A1 *    3/2003    Lontka et al. .............. 345/771
2004/0001449 A1 *    1/2004    Rostron et al. ............. 370/282

FOREIGN PATENT DOCUMENTS

JP    A-2002-278663    9/2002

\* cited by examiner

*Primary Examiner*—Phung T. Nguyen
(74) *Attorney, Agent, or Firm*—Morgan, Lewis & Bockius LLP

(57) ABSTRACT

An image processor, having a control panel with a display function and performing device operation and external access using the control panel, includes a control panel operating status judgment unit which judges whether the operating status of the control panel is a device operation status or an external access status, an abnormality detection unit which detects the abnormality of the device, a reporting mode select unit which selects a reporting mode of a device abnormality when the device abnormality is detected by the abnormality detection unit, according to the operating status of the control panel judged by the control panel operating status judgment unit and the type of device abnormality detected by the abnormality detection unit, and a reporting unit which reports the device abnormality detected by the abnormality detection unit in the reporting mode selected by the reporting mode select unit.

13 Claims, 14 Drawing Sheets

| DEVICE ERROR | | DISPLAY CONTENT | | | |
|---|---|---|---|---|---|
| CODE | ERROR TYPE | CURRENT DISPLAY SCREEN INFORMATION | DISPLAY PATTERN | DISPLAY DATA | DISPLAY TIME |
| 1001 | PAPER JAM | BROWSER SCREEN | A | xxx. bmp | — |
| | | DEVICE UI | D | ・・・・・・ | — |
| 1901 | OUT OF PAPER | BROWSER SCREEN | C | ・・・・・・ | — |
| | | DEVICE UI | D | ・・・・・・ | — |
| 1801 | TRY COVER OPEN | BROWSER SCREEN | B | ・・・・・・ | 30 SEC |
| | | DEVICE UI | D | ・・・・・・ | — |
| ⋮ | ⋮ | ⋮ | ⋮ | ⋮ | ⋮ |
| 2002 | OUTPUT DESTINATION TRAY FULL | BROWSER SCREEN | A | ・・・・・・ | 30 SEC |
| | | DEVICE UI | D | ・・・・・・ | — |

| DEVICE ERROR | |
|---|---|
| CODE | ERROR TYPE |
| 1001 | PAPER JAM |
| 1901 | OUT OF PAPER |
| 1801 | TRAY COVER OPEN |
| ⋮ | ⋮ |
| 2002 | OUTPUT DESTINATION TRAY FULL |

FIG.5

| OPERATION/ EVENT | ERROR DISPLAY SCREEN | | | |
|---|---|---|---|---|
| | A (POPUP) | B (ICON) | C (STATUS) | D (FULL SCREEN) |
| CLOSE (UNPROCESSED ERROR EXISTS) | B (ICON) | ✕ | B (ICON) | B (ICON) |
| CLOSE (NO ERROR) | BROWSER SCREEN | ✕ | BROWSER SCREEN | BROWSER SCREEN |
| DETAILED DISPLAY | D (FULL SCREEN) | C (STATUS) | D (FULL SCREEN) | ✕ |
| ERROR RECOVERY | BROWSER SCREEN POPUP DELETE | BROWSER SCREEN ICON DELETE | STATUS BAR CLEAR | BROWSER SCREEN |
| BROWSER END | ✕ | D (FULL SCREEN) ※DEVICE OPERATION SCREEN | D (FULL SCREEN) ※DEVICE OPERATION SCREEN | D (FULL SCREEN) ※DEVICE OPERATION SCREEN |

FIG.13

IMAGE PROCESSOR, ABNORMALITY REPORTING METHOD AND ABNORMALITY REPORTING PROGRAM

BACKGROUND OF THE INVENTION

1. Field of the Invention

The present invention relates to an image processor which acquires data from a server on a network and displays the acquired data and an abnormality reporting method and abnormality reporting program for the image processor, and more particularly to a technology for displaying a device error which is generated while the data on the server is being displayed.

2. Description of the Related Art

As an image processor that has the functions of a WEB browser, an "information processor" is disclosed in Japanese Patent Application Laid-Open No. 2002-278663.

The invention in Japanese Patent Application Laid-Open No. 2002-278663 is aimed at displaying an appropriate error screen according to the operating status of the information processor, and has an acquisition unit for acquiring data from a server device connected to a network, a display unit for displaying the data acquired by the acquisition unit, an analysis unit for extracting error display control information included in the acquired data by analyzing the data acquired by the acquisition unit, a holding unit for holding the error display control information extracted by the analysis unit, and an error display control unit for displaying an error screen based on the error display control information held by the holding unit when an error occurs during connection to a server device.

A conventional image processor which has a control panel with a browser display function cannot notify an error to the user when a device error occurs while a WEB server is accessed by the browser, and the user cannot know content details of the device error unless the browser screen is ended first and then an operation to display details of the error is performed continuously.

SUMMARY OF THE INVENTION

With the foregoing in view, the present invention provides an image processor which has a browser function and can select an optimum error information notification control method according to the operating status (device operation, browser operation) to notify the user, and an abnormality reporting method and an abnormality reporting program for the image processor.

An aspect of the present invention provides an image processor that has a control panel having a display function, and performs device operation and external access using the control panel, including: a control panel operating status judgment unit which judges whether the operating status of the control panel is device operation status or external access status; an abnormality detection unit which detects the abnormality of the device; a reporting mode select unit which selects a reporting mode of a device abnormality when the device abnormality is detected by the abnormality detection unit, according to the operating status of the control panel judged by the control panel operating status judgment unit and the type of device abnormality detected by the abnormality detection unit; and a reporting unit which reports the device abnormality detected by the abnormality detection unit in the reporting mode selected by the reporting mode select unit.

A further aspect of the present invention provides an abnormality reporting method for an image processor that has a control panel having a display function and performs device operation and external access using the control panel, including: judging whether the operating status of the control panel is in device operating status or in external access status by a control panel operating status judgment unit; detecting an abnormality by an abnormality detection unit; selecting a reporting mode of a device abnormality by a reporting mode select unit when the device abnormality is detected by the abnormality detection unit, according to the operating status of the control panel judged by the control panel operating status judgment unit and the type of device abnormality detected by the abnormality detection unit; and reporting, by a reporting unit, the device abnormality detected by the abnormality detection unit in the reporting mode selected by the reporting mode select unit.

A still further aspect of the present invention provides a program of instructions executable by a computer to perform a function for reporting abnormality for an image processor that has a control panel having a display function and performs device operation and external access using the control panel the program comprising: a step of judging whether the operating status of the control panel is a device operating status or an external access status; a step of detecting a device abnormality; a step of selecting a reporting mode of a device abnormality by a reporting mode select unit when the device abnormality is detected, according to the operating status of the control panel judged in the status judging step and the type of device abnormality detected in the abnormality detecting step; and a step of reporting the device abnormality detected in the abnormality detecting step in the reporting mode selected in the reporting mode selecting step.

With the image processor and the abnormality reporting method and the abnormality reporting program for the image processor according to the present invention, a user can be notified by a selected error notification control method that is most appropriate for the user operation (device operation, browser operation) of the device.

If a device error occurs while the browser function is in-use, the screen can be returned to the browser screen from the error confirmation screen or error confirmation operation with a minimum required operation.

By this, a drop in the utilization rate of the browser function by an error of the image processor can be minimized, and the confirmation of the error type and the operability in error recovery when the device error occurred can be improved.

BRIEF DESCRIPTION OF THE DRAWINGS

Embodiments of the present invention will be described in detail based on the following figures, wherein:

FIG. 4 is a table showing an example of the abnormality notification control management table;

FIG. 5 is a table showing an example of device error codes;

FIG. 13 is a screen transition table to show the display type of the popup screen, icon display, status bar display screen, and error detail display screen which display an error at browser startup, events for each display type and transition screen for each event.

DETAILED DESCRIPTION OF THE INVENTION

Embodiments of the image processor and the abnormality reporting method and the abnormality reporting program for the image processor according to the present invention will now be described with reference to the accompanying drawings.

Figure 1:
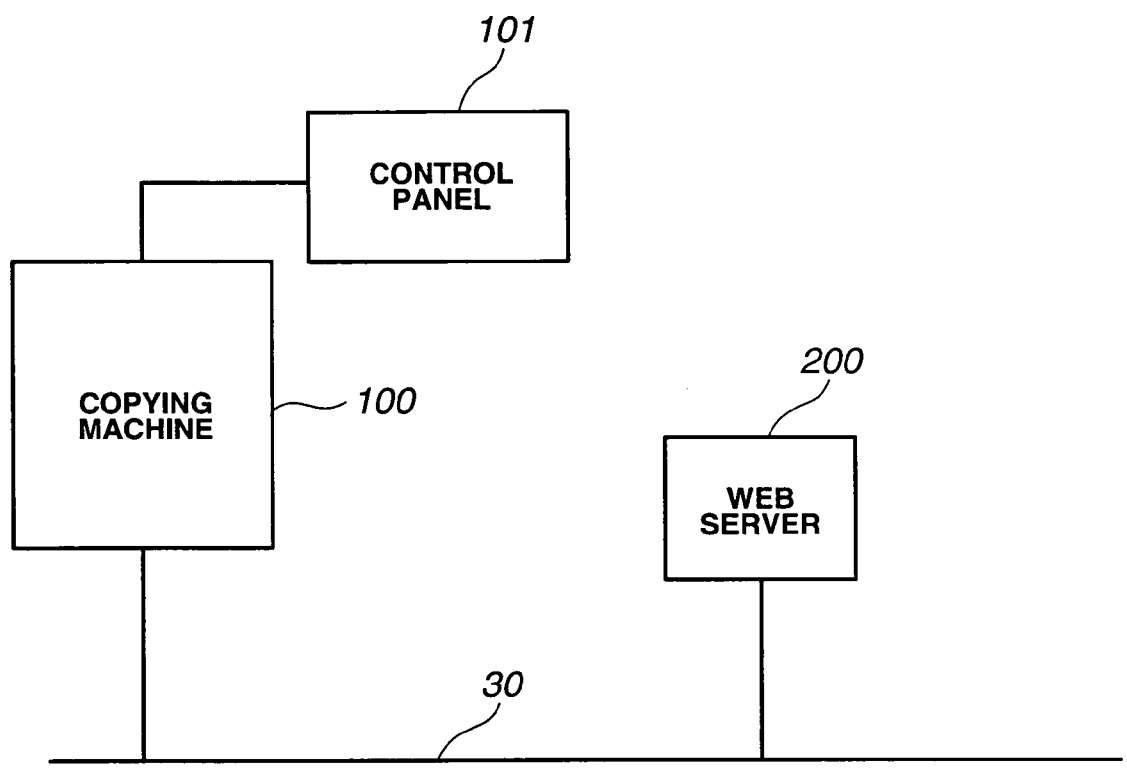
FIG. 1 is a block diagram depicting the connection in an embodiment of the present invention which includes the image processor.

FIG. 1 is a block diagram depicting an example when the image processor of the present invention is a copying machine.

In FIG. 1, the copying machine 100 has a control panel 101 for displaying a device operation screen for operating various functions of the copying machine, and has functions which include not only the operating functions of a conventional copying machine but also starting up the WEB browser from the control panel 101, accessing the WEB server 200 on the network 30, and displaying the acquired content of the WEB page on the control panel 100 as a browser screen.

If a device error such as a "paper jam" occurs in a status where the browser screen is displayed on the control panel 101, the copying machine 100 also has a function to display the error information on the WEB browser screen.

The network 30 is a LAN (Local Area Network) established in a company or the Internet that can be connected to via a LAN, or an Internet that can be connected to via such an access line as a metallic cable or optical fiber.

If the network 30 is a LAN in a company where the copying machine 100 is installed, and the WEB server 200 and the copying machine 100 are installed to the LAN, the WEB server 200 stores and manages the URL (Uniform Resource Locator) of the WEB page for controlling the copying machine and accepting orders for consumables, such as copy paper, and the URL of the company bulletin board controlled by, for example, an information system division.

If the network 30 is the Internet connected to via an access line and the WEB server 200 is installed on the Internet, and if the copying machine 100 is installed outside the company, such as a convenience store, on the other hand, the WEB server 200 stores and manages the URL of the portal site which has a WEB search engine.

Figure 2:
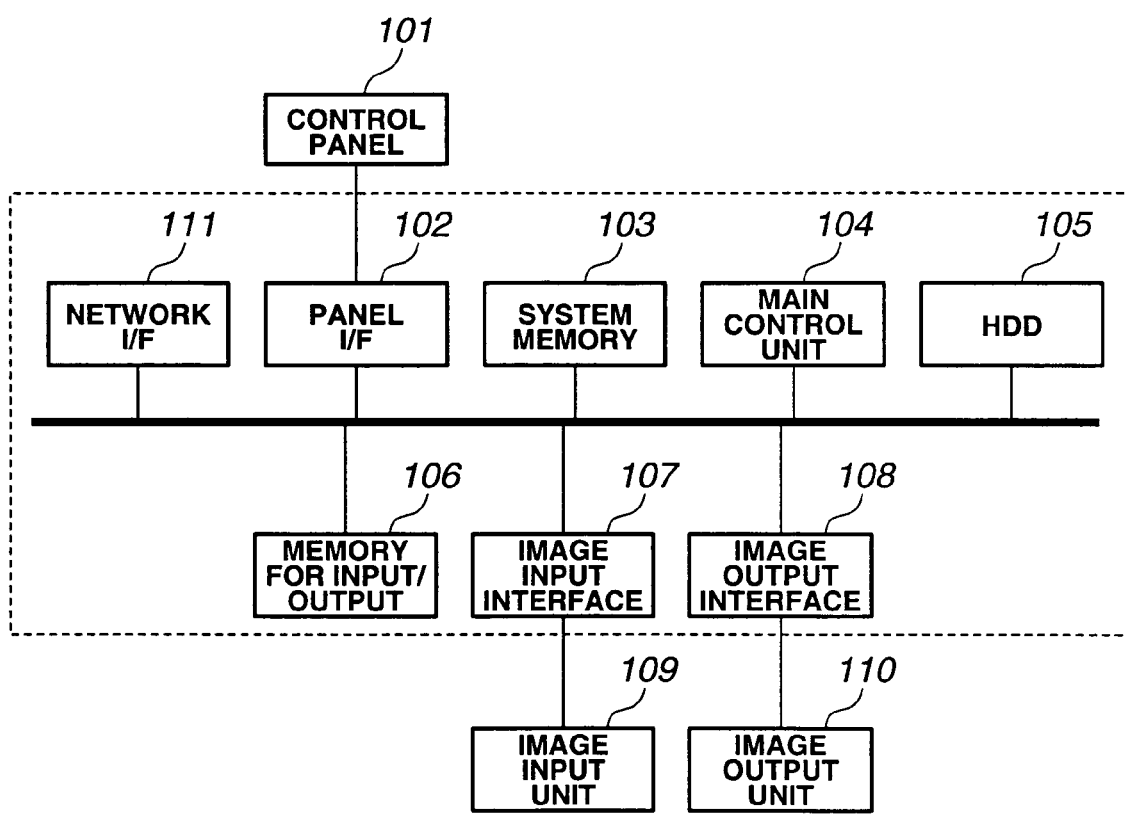
FIG. 2 is a block diagram depicting the control configuration of the image processor in FIG. 1.

FIG. 2 is a block diagram depicting a hardware configuration of the copying machine 100.

The copying machine 100 has a control panel 101, panel I/F 102, system memory 103, main control unit 104, HDD (Hard Disk Drive) 105, network interface 111, image input unit 109, image input interface 107, image output unit 110, image output interface 108 and input/output memory 106.

The main control unit 104 is for executing various control processings according to the control programs of the copying machine 100 stored in the system memory 103 and HDD 105.

The HDD 105 stores various data, including display data to be the base of various screens to be displayed on the control panel 101, and a table on error display control.

The input/output memory 106 is a temporary storage area of the operation data when the main control unit 104 executes processing according to the control program stored in the system memory 103 or HDD 105.

The network interface 111 is for implementing the data communication with the WEB server 200 via the network 30 by such protocols as HTTP.

The data received through this network interface 111 is stored and held on the HDD 105.

The control panel 101 has a touch panel type display panel and dedicated operation buttons, and is an input/output device for performing input operation to its own device and displaying on an operation screen, a setup screen, browser screen and other screens of its own device.

The image input unit 109 reads the original data, converts it into digital image data, and outputs it to the main control unit 104 via the image input interface 107 as a function of the copying machine 100.

The image output unit 110 receives the image data for output, which was processed by executing the image processing program by the main control unit 104, via the image output interface 108, and performs printing processing to the recording paper.

The system memory 103 manages the device error code list 53, the identifier of the screen currently displayed on the control panel 101, the screen display information 51 for storing and managing the identifier of the screen which was displayed on the control panel 101 when a device error occurred, the abnormality notification control management table 50 for determining the type of screen being displayed on the control panel 101 and the error notification method according to the type of device error which occurred, as control information related to error display control, and if the device error display is held in the status where the WEB browser is displayed on the control panel 101, the system memory 103 stores the display holding screen information 54 for the information related to the holding error screen.

Figure 3:
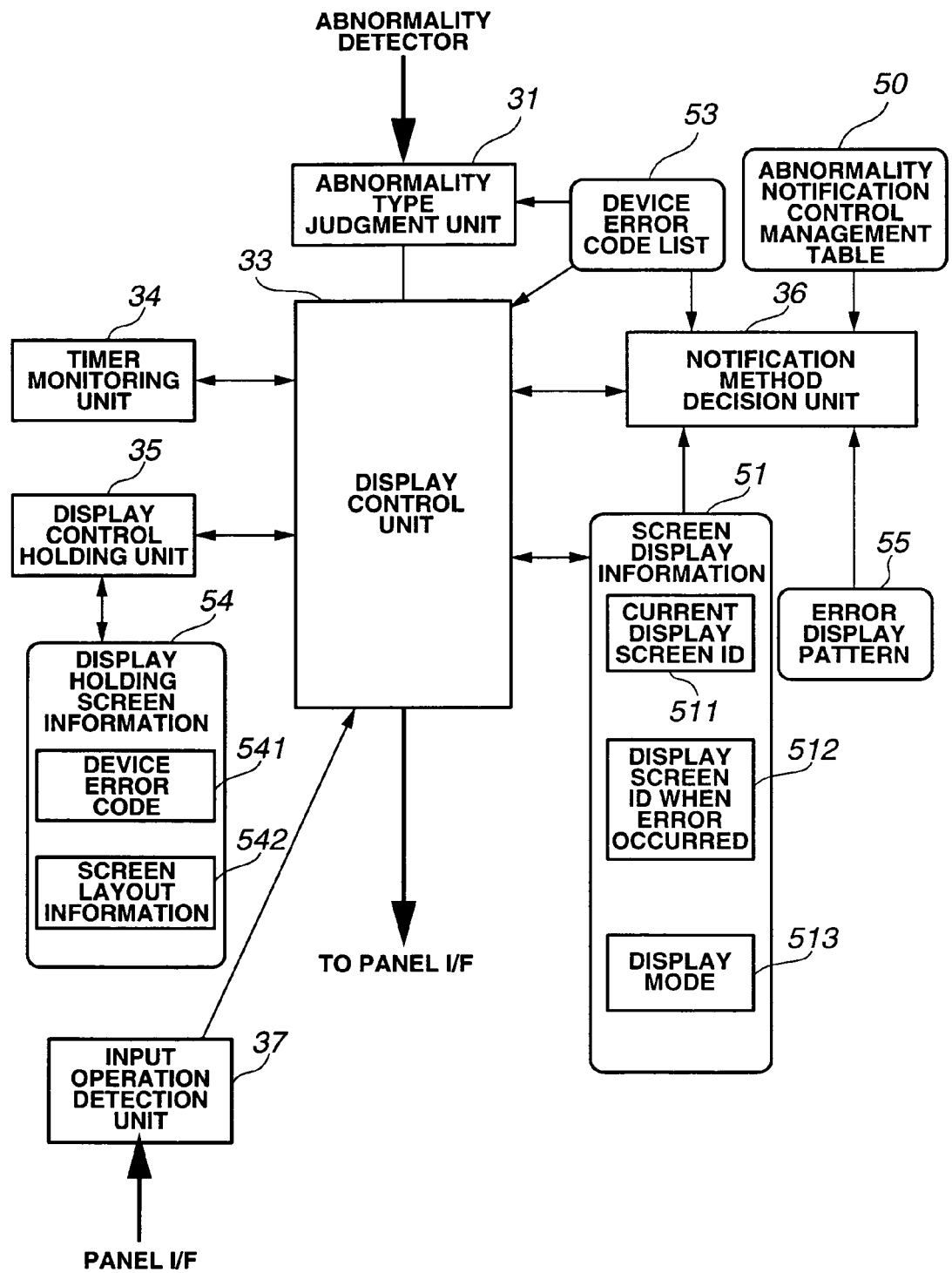
FIG. 3 is a block diagram depicting a function configuration on the error display in FIG. 2.

FIG. 3 is a functional block diagram on the error display control of the copying machine 100 shown in FIG. 1. In FIG. 3, the error display control function is provided by each control of the abnormality type judgment unit 31, display control unit 33, timer monitoring unit 34, display control holding unit 35 and notification method decision unit 36.

When the device error detection signal, which is detected by the sensor equipped in each unit of the copying machine 100, is received, the abnormality type judgment unit 31 analyzes the device error detection signal, and specifies an applicable device error code by referring to the device error code list 53 shown in FIG. 5 stored in the system memory 103, and outputs it to the display control unit 33.

The display control unit 33 sets the type of screen currently displayed on the control panel 101 on the screen display information 51, and notifies the device error code notified from the abnormality type judgment unit 31 to the notification method decision unit 36 to inquire the error notification method on the control panel 101.

The notification method decision unit 36 specifies the applicable error notification method by referring to the abnormality notification control management table 50 (FIG. 4) based on the device error code notified from the display control unit 33 and the current display screen ID 511 recorded in the screen display information 51, and outputs the information on the data for display, which is required for controlling the display of the error screen to the display control unit 33, as the inquiry result.

The display control unit 33 analyzes the response data notified from the notification method decision unit 36, creates data for the display of the error information based on the error notification method being set, and outputs it to the panel I/F 102.

If the device error is displayed on the browser screen, and if it is set for the abnormality notification control management table 50 that the error information displayed on the browser screen is automatically deleted from the screen after a predetermined time has elapsed, the display control unit 33 notifies the display time to the timer monitoring unit 34 to instruct to monitor the display time.

The timer monitoring unit 34 monitors the display time and notifies time-up to the display control unit 33 when time-up is detected.

When the device error notification method is an icon display or a status bar display and when an operation to force-quit the error information display is generated, the display control holding unit 35 records the device error code and the information related to the icon screen or popup screen which is currently displayed on the control panel 101 to the display holding screen information 54.

Figure 10:
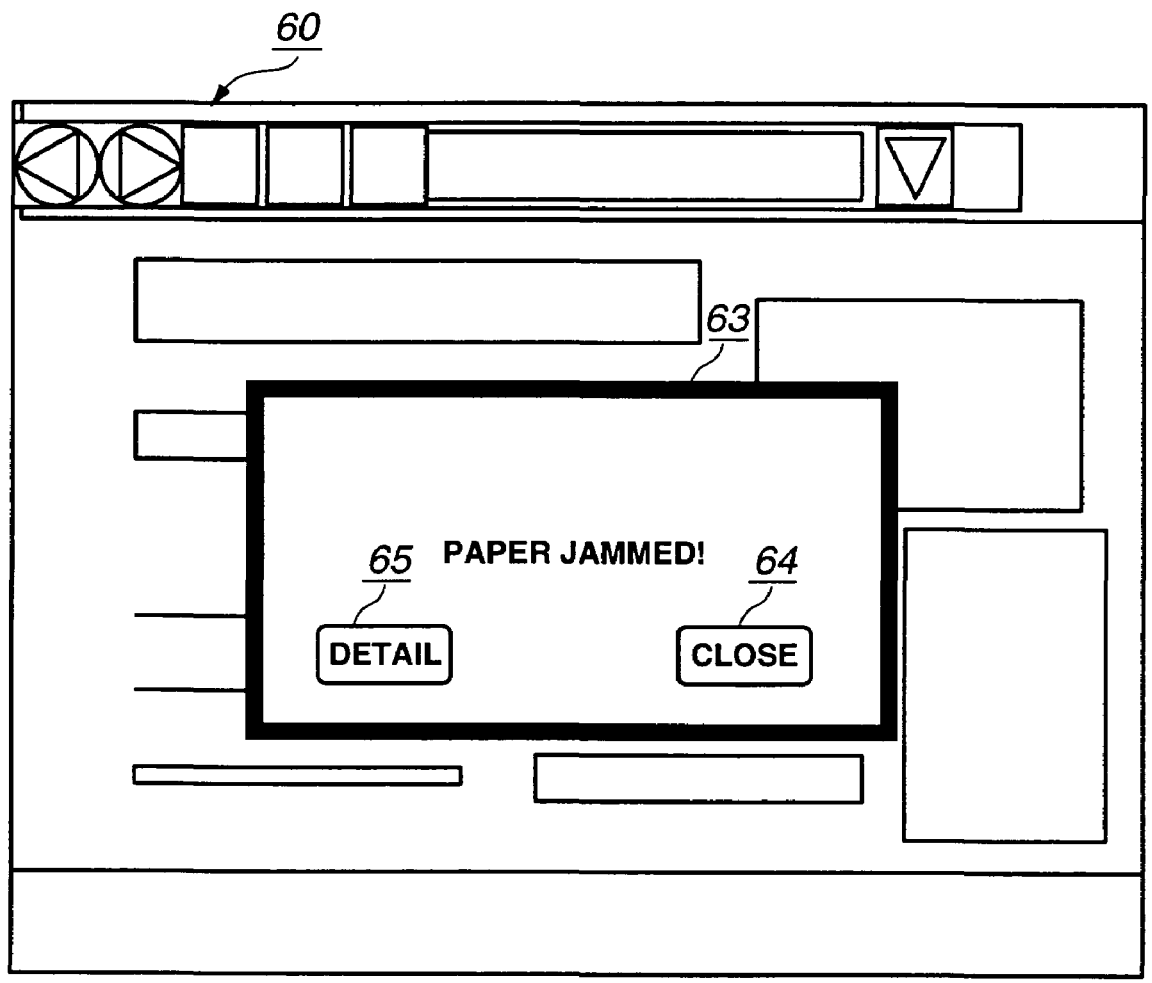
FIG. 10 is a diagram depicting an example of the display image of the control panel when the error that was generated when accessing the WEB server is notified by the popup screen.
Figure 11:
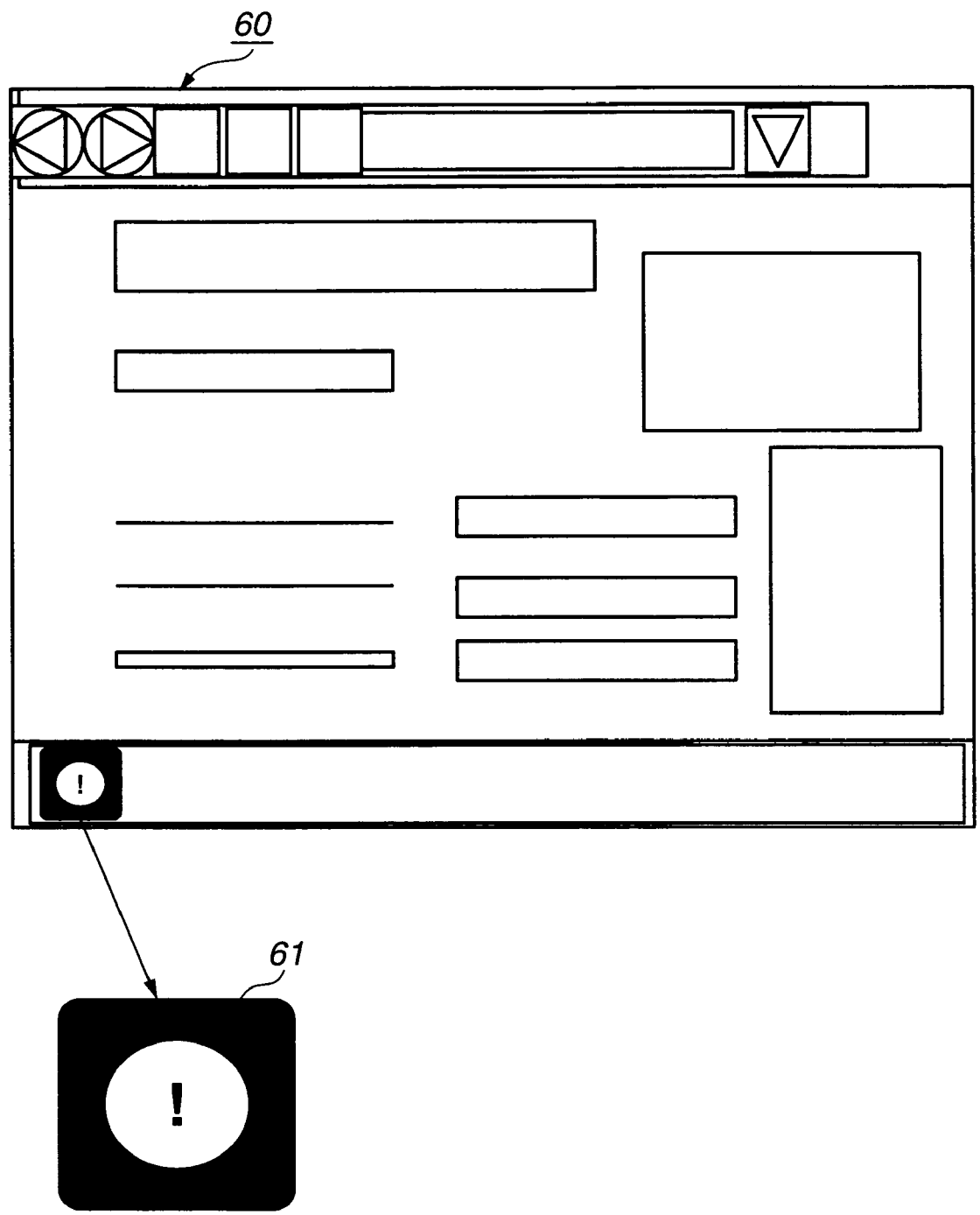
FIG. 11 is a diagram depicting an example of the display image of the control panel when the error that was generated when accessing the WEB server is reported by an icon.
Figure 12:
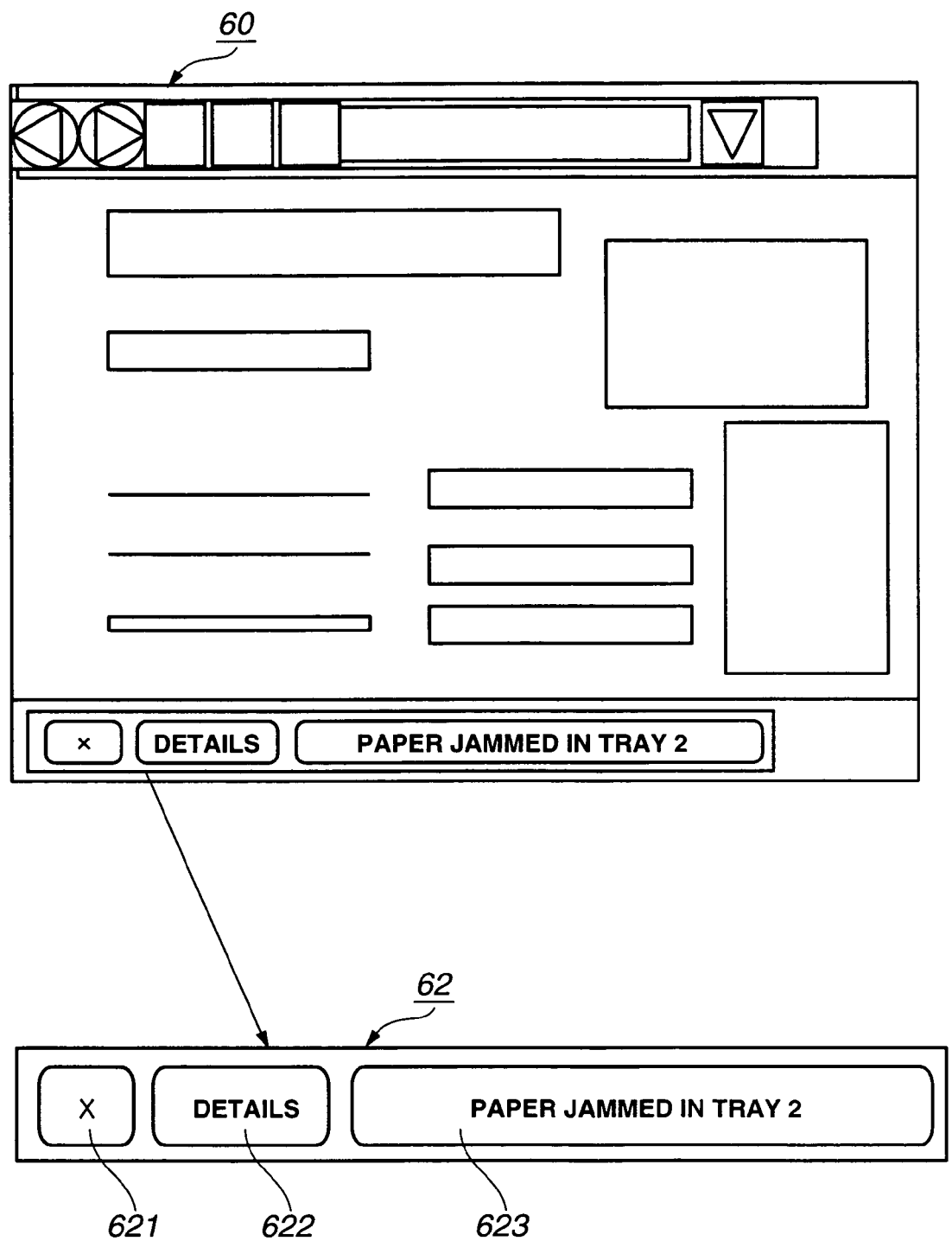
FIG. 12 is a diagram depicting an example of the display image of the control panel when the error that was generated when accessing the WEB server is reported by a status bar.

Timing to display the holding screen recorded in the display holding screen information 54 is when a select operation, double-clicking on an icon 61, for example, is performed in the case of the icon display screen in FIG. 11, and when the pressing of the detail button is detected in the case of the status bar 62 in FIG. 12 or the popup screen 63 in FIG. 10 being displayed.

Whether the device error was recovered or not is inquired to the abnormality type judgment unit 31 just before starting display of the error detail display screen 80 (FIG. 8) which has been held, and if the device error is not recovered, the error detail screen, which has been held, is output to the control panel 101.

If the icon display screen which is the parent screen of the screen being held, the display screen of the status bar 62 and the screen displaying the popup screen 63 are force-quit by selecting the close button, or if the device error corresponding to the screen of which display is held is cleared by the recovery operation, the content of the display holding screen information 54 is cleared by the display control unit 33.

FIG. 4 is a table showing an example of the abnormality notification control management table 50.

In FIG. 4, the abnormality notification control management table 50 has the device error codes 501 for identifying the device error and the corresponding display content.

Figure 6:
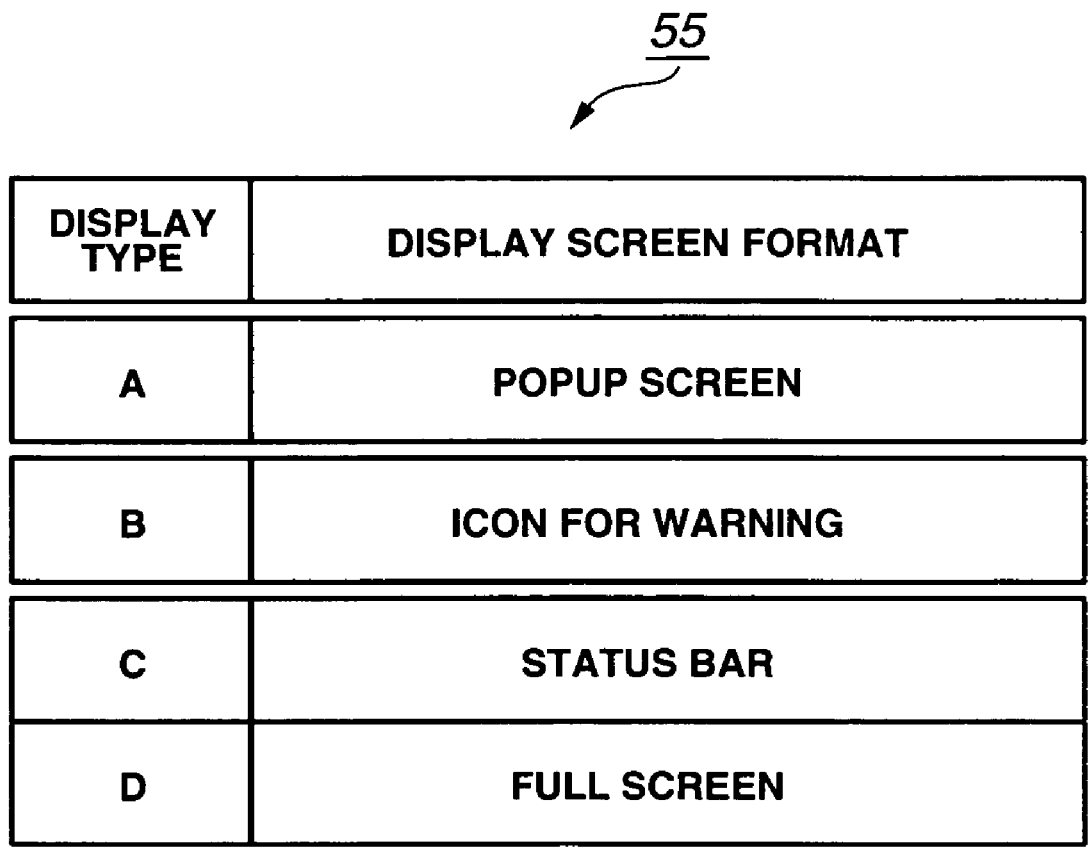
FIG. 6 is a table showing an example of error display patterns.
Figure 7:
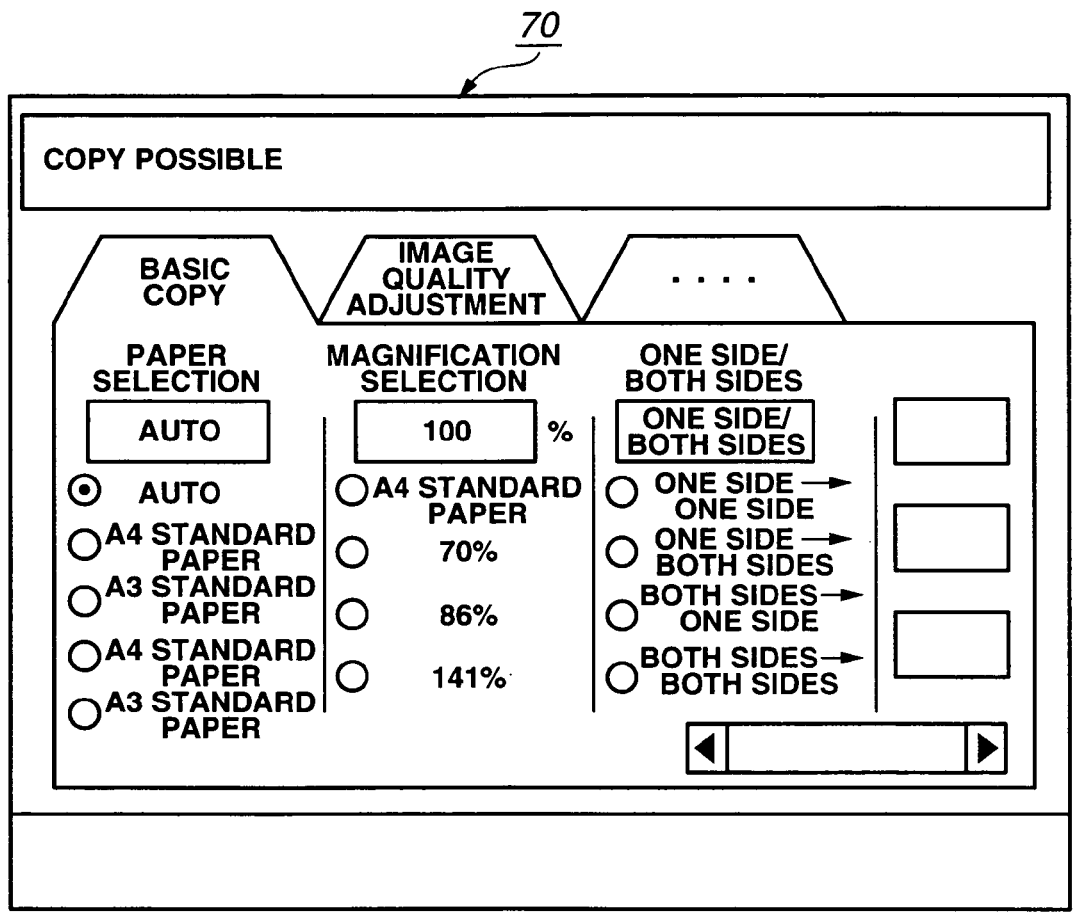
FIG. 7 is a diagram depicting an example of a display image of the control panel when the device control screen is displayed.
Figure 9:
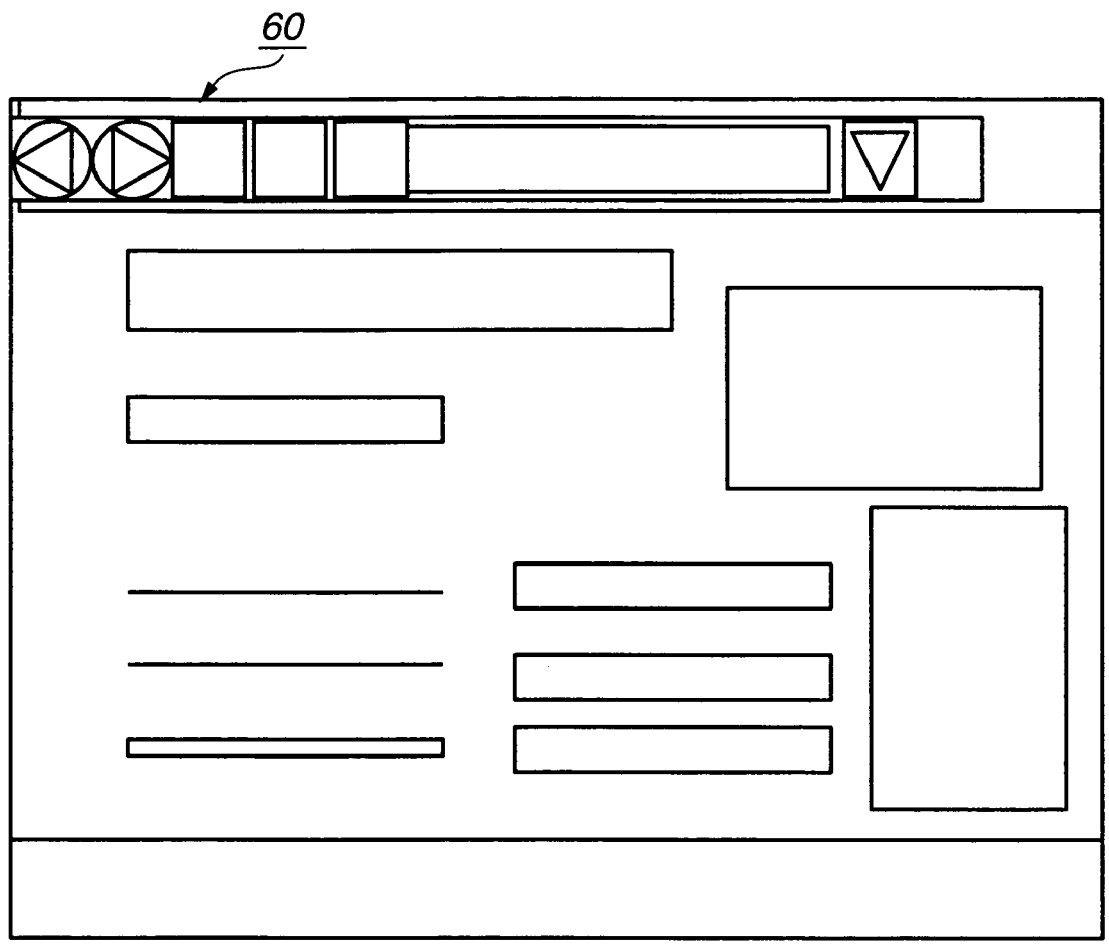
FIG. 9 is a diagram depicting the display image of the control panel when the WEB server is accessed.

The items to be registered and managed as the display content are "current display screen information" 502 which indicates whether the display screen of the control panel 101 is the device operation screen 70 shown in FIG. 7 or the browser screen 60 shown in FIG. 9, and "display pattern" 503, "display data" 504 and "display time" 505 which are displayed for each screen type of the "current display screen information" 502. "The display pattern" 503 is set based on the error display pattern list 55 which registers and manages the error notification mode as an encoded display type, as shown in FIG. 6.

For example, if the "display pattern" is "A", this means that an error is notified by displaying it on the popup screen 63, as shown in FIG. 10.

If the "display pattern" 503 is "B", this means that an error is display by displaying a dedicated icon 61 at the lower left end of the display area of the browser screen 60, as shown in FIG. 11.

If the "display pattern" 503 is "C", this means that an error is notified by displaying the status bar 62 at the lower area of the display area of the control panel 101, as shown in FIG. 12.

Figure 8:
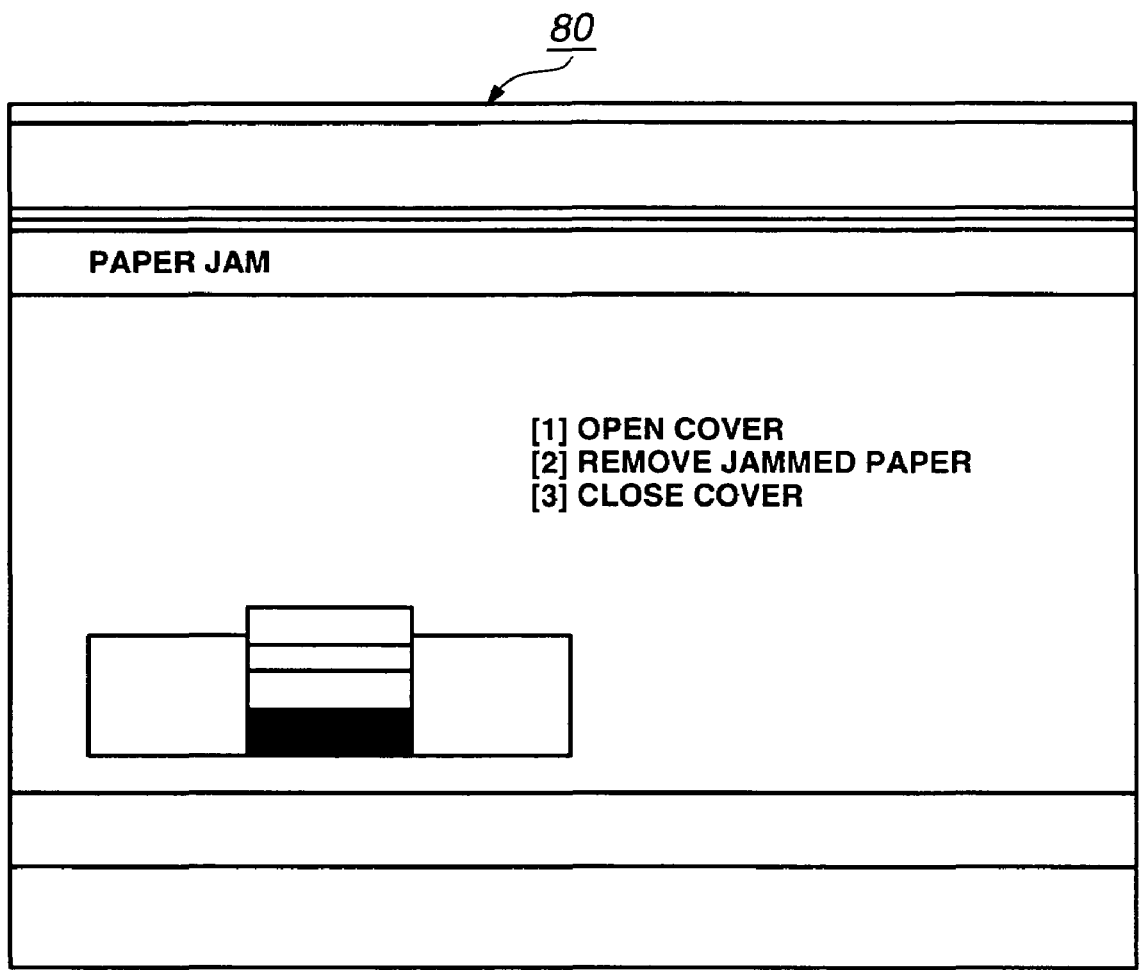
FIG. 8 is a diagram depicting an example of the display image of the control panel when detailed information of the error is displayed.

If the "display pattern" 503 is "D", this means that an error is notified by displaying the error detail display screen 80, as shown in FIG. 8, for showing the detail of the device error and the content of the recovery operation on the entire display area of the control panel 101.

To display the icon 61 shown in FIG. 11, for example, information on the bit map file storage location of the icon 61 is set in the "display data" 504.

When the urgency of the recovery operation of the device error is low, and especially when the browser screen 60 is being displayed, the display time of an error which is monitored by a timer is set in the "display time" 505 if a device error, for which the display may be automatically ended after a predetermined time has elapsed without affecting operation, is notified.

The configuration of the abnormality notification control management table 50 is not limited to the configuration shown in FIG. 4, only if the display mode of the error information can be specified in the control panel 101 by the identification information of the current display screen and the device error code.

Now each error screen, which is notified according to the specification in the abnormality notification control management table 50, shown in FIG. 4, and the transition of the screens by screen operation in the control panel 101 or the recovery of the device error of the copying machine 100, will be described.

FIG. 13 is a screen transition table showing events for each of the error detail display screen (FIG. 8), the browser screen (FIG. 9), the popup screen (FIG. 10), the icon display screen (FIG. 11) and the status bar display screen (FIG. 12), and the transition screens thereof.

In FIG. 13, the index in the horizontal direction of the matrix is the error display pattern, and the index in the vertical direction of the matrix shows various events, such as the operation of the control panel 101 which is generated during screen display, or the status change in the copying machine 100.

The screen display pattern at the transition destination is shown in the cells of the matrix specified by the error display pattern and the even in the table.

A block where nothing is written in the currently displayed error screen indicates that an operation event corresponding to that block will never be generated.

For example, in an operation where even if the "close" button and an unprocessed error exist in the popup screen 63 that is the error display pattern "A", the popup screen 63 is cleared, and the screen transits to the icon display screen (FIG. 11).

If the operation of selecting the currently displayed icon 61 is performed in the icon display screen (FIG. 11) that is the error display pattern "B", the screen transits to the status bar 62 display screen (FIG. 12) which indicates the information of the device error.

If the device error is recovered by the device error recovery operation by the operator when the status bar display screen, that is display pattern "C", is being displayed, the status bar 62 being displayed is cleared, and the screen transits to the ordinary browser screen 60 (FIG. 9).

If the operator ended the browser function in the status where the device error detail display screen (FIG. 8) is displayed when the browser is started up, the screen transits to the device error detail display screen 80 in the device operation mode.

Now the error display control for the control panel 101, when the device error occurred when the browser screen is being displayed, will be described using the reference numerals shown in the block diagram in FIG. 2 and in the functional block diagram in FIG. 3.

Figure 14:
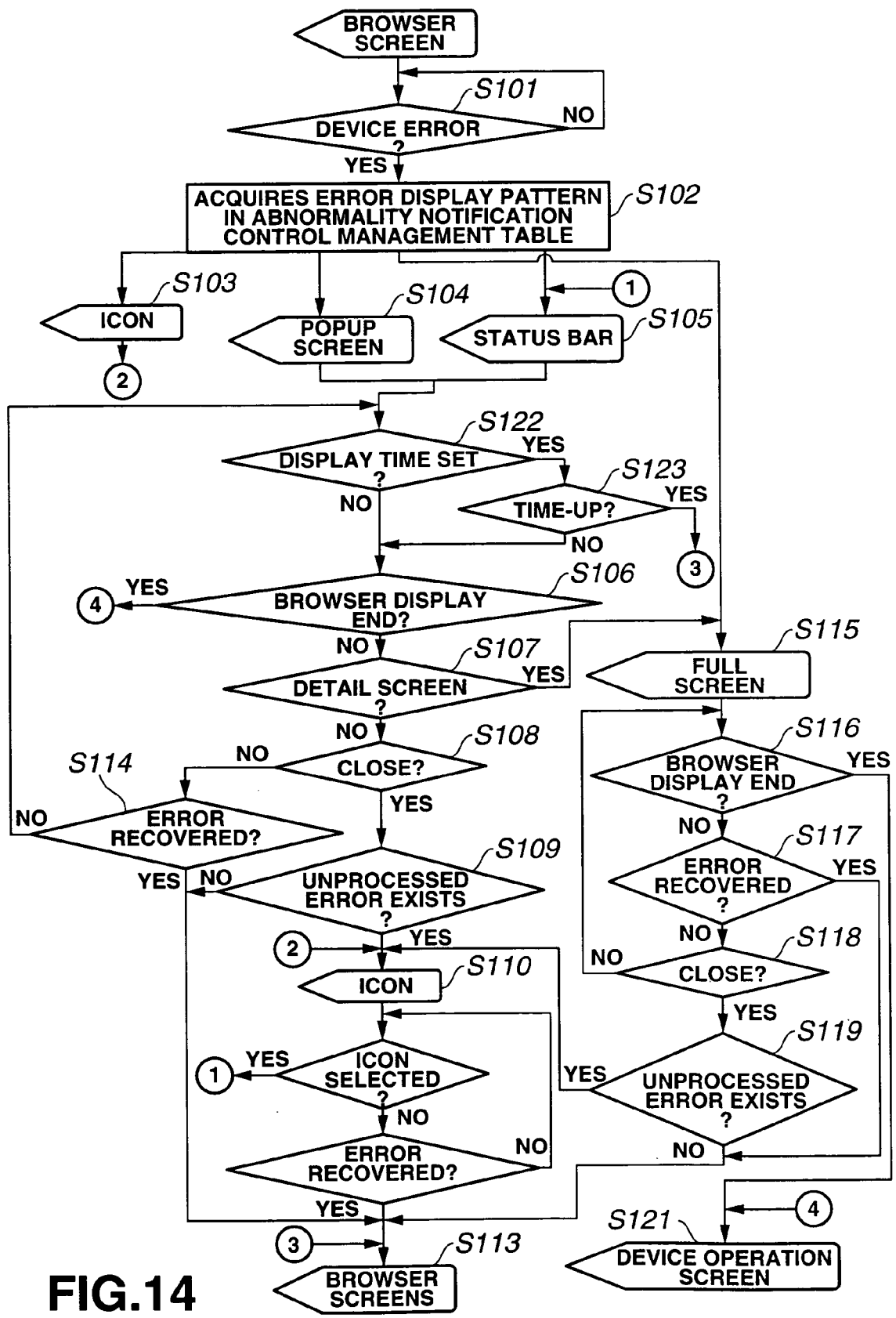
FIG. 14 is a flow chart depicting an example of the error display control.

FIG. 14 is a flow chart depicting an example of the error display control.

When the abnormality type judgment unit 31 detects a device error, the display control unit 33 notifies the device error code to the notification method decision unit 36 to inquire the display mode of the device error (S101).

The notification method decision unit 36 specifies the corresponding identification information of the error display pattern and the display data from the abnormality notification control management table 50 based on the notified device error code and the identification information of the currently displayed screen recorded in the current display screen ID 511 in the screen display information 51, and notifies it to the display control unit 33 (S102).

The display control unit 33 reads the file from the HDD 105 and creates display data according to the error display type notified from the notification method decision unit 36, and selects the display of the icon display screen (FIG. 11) (S103), the display of the popup display screen (FIG. 10) (S104), and the display of the status bar display screen (FIG. 12) (S105), and the display in the full-screen mode (FIG. 8) accordingly (S115).

In the popup display screen (FIG. 10) (S104) and the status bar display screen (FIG. 12) (S105), if the monitoring time is set in the display time 505 of the abnormality notification control management table 50 corresponding to the displayed device error code (YES in S122), the display control unit 33 judges whether time-up is notified from the timer monitoring unit 34, and if an interrupt by time-up detection is generated (YES in S123), the display control unit 33 instructs the display control holding unit 35 to set the information on the current display screen to the display holding screen information 54, ends the display of the popup screen or the status bar, and displays the ordinary browser screen (S113).

If the browser end operation is executed (YES in S106) in the popup display screen (FIG. 10) (S104) and the status bar display screen (FIG. 12) (S105), the display control unit 33 outputs the display data for displaying in the full-screen mode in the device operation mode to the panel I/F 102, and updates the current display screen ID 511 of the screen display information 51 (S121).

If the data display 65 of the popup screen 63 is selected, or if the detail display button 622 of the status bar 62 is selected (YES in S107), the display control unit 33 outputs the display data for displaying the detail of the error corresponding to the device error code to the panel I/F 102 (S115).

If the close button 64 is selected in the popup screen 63, or if the close button 621 of the status bar 62 is selected (YES in S108), the display control unit 33 inquires the abnormality type judgment unit 31 whether an unprocessed device error exists (S109), and if an unprocessed device error exists (YES in S109), the display control unit 33 displays the icon 61 in the lower area of the browser screen (S110).

If there is no unprocessed device error (NO in S109), the popup screen 63 and the status bar 62 are cleared, and the display returns to the ordinary browser screen (S113).

If the error recovers (YES in S114) when the popup display screen (FIG. 10) (S104) or the status bar display screen (FIG. 12) (S105) is being displayed, the display control unit 33 clears the popup screen 63 and the status bar 62, and the display returns to the ordinary browser screen (S113).

If the input operation detection unit 37 detects the icon 61 select operation (YES in S111) in the icon display screen (S110), the display control unit 33 creates the display data for notifying the error content corresponding to the device error code to the status bar 62, and outputs it to the panel I/F 102 (S105).

If the error is recovered (S112) in the icon display screen (S110), the display control unit 33 clears the icon 61, and the display returns to the ordinary browser screen (S113).

If the operation to close the device error display is executed (YES in S118) when the device error is displayed in the full-screen mode (S115), the display control unit 33 judges whether an unprocessed error exists (S119).

If an unprocessed error exists (YES in S119), the display control unit 33 creates the display data for the icon display screen (FIG. 11), and outputs it to the panel I/F 102 (S110).

If the device error is recovered by the device error recovery operation (YES in S117) when the device error is displayed in the full-screen mode (S115), the display control unit 33 creates the display data for the ordinary browser display screen, and outputs it to the panel I/F 102 (S113).

If the browser end operation is generated (YES in S116) when the device error is displayed in the full-screen mode (S115), the display control unit 33 creates the display data for the error display screen in the device operation mode, outputs it to the panel I/F 102, and updates the screen display information 51 (S121). If the end operation for the error screen display is executed (YES in S118) when the device error is displayed in the full-screen mode (S115), and if an unprocessed error exists (YES in S119), the display control unit 33 creates the display data for the icon display data, and outputs it to the panel I/F 102 (S110), and if there is no unprocessed error (NO in S119), the display control unit 33 creates the display data for the ordinary browser screen, and outputs it to the panel I/F (S113).

The image processor the abnormality reporting method and the abnormality reporting program for the image processor according to the present invention can be applied to an image processor that has a browser function, and accesses a WEB server by operating the control panel, which performs various operations of the image processor, and displays the browser screen.

It is also applicable to an image processor where whether the status is a browser screen or operation screen is judged when a device error is detected, and an optimum notification method for the operating status of the control panel is selected, and the error display is displayed.

The entire disclosure of Japanese Patent Application Laid-Open No. 2004-275794 filed on Sep. 22, 2004, including the specifications, claims, drawings and abstract, is incorporated herein by reference in its entirety.

What is claimed is:

1. An image processor that has a control panel having a display function, and performs device operation and external access using the control panel, comprising:
   a control panel operating status judgment unit which judges whether the operating status of the control panel is a device operation status or an external access status;
   an abnormality detection unit which detects the abnormality of the device;
   a reporting mode select unit which selects a reporting mode of a device abnormality when the device abnormality is detected by the abnormality detection unit, according to the operating status of the control panel judged by the control panel operating status judgment unit and the type of device abnormality detected by the abnormality detection unit; and
   a reporting unit which reports the device abnormality detected by the abnormality detection unit in the reporting mode selected by the reporting mode select unit.

2. The image processor according to claim 1, wherein the reporting mode to be selected by the reporting mode select unit comprises a first reporting mode for reporting the device abnormality by the display of the control panel, a second reporting mode for reporting the device abnormality without using the display of the control panel, and a third reporting mode for not reporting the device abnormality.

3. The image processor according to claim 1, wherein when the control panel operating status judgment unit judges that the operating status of the control panel is the external access status for displaying the browser screen, the reporting mode select unit selects a reporting mode to display an icon for indicating the device abnormality detected by the abnormality detection unit on at least a part of the display area of the browser screen.

4. The image processor according to claim 3, wherein the icon is automatically deleted after being displayed for a predetermined time, which is set in advance.

5. The image processor according to claim 1, wherein when the control panel operating status judgment unit judges that the operating status of the control panel is the external access status for displaying the browser screen, the reporting mode select unit selects a reporting mode to display a popup screen to indicate the device abnormality detected by the abnormality detection unit, overlapping the browser screen.

6. The image processor according to claim 5, wherein the popup screen is automatically deleted after being displayed for a predetermined time, which is set in advance.

7. The image processor according to claim 1, wherein when the control panel operating status judgment unit judges that the operating status of the control panel is the external access status for displaying the browser screen, the reporting mode select unit selects a reporting mode to display an abnormality display area including a request button for display of the type of the device abnormality detected by the abnormality detection unit and the detailed display thereof on a part of the browser screen.

8. The image processor according to claim 7, wherein the abnormality display area is automatically deleted after being displayed for a predetermined time, which is set in advance.

9. The image processor according to claim 1, further comprising a storage unit which stores the device abnormality for which a recovery operation was not performed among the device abnormalities reported by the reporting unit.

10. The image processor according to claim 1, further comprising a storage unit which stores the device abnormality for which a recovery operation was not performed among the device abnormalities reported by the reporting unit when the control panel operating status is the external access status, wherein when the control panel operating status changes from the external access status to the device operation status, all the device abnormalities stored in the storage unit are displayed on the control panel.

11. An abnormality reporting method for an image processor that has a control panel having a display function and performs device operation and external access using the control panel, comprising:
   judging whether the operating status of the control panel is a device operating status or an external access;
   detecting a device abnormality;
   selecting a reporting mode of a device abnormality by a reporting mode select unit when the device abnormality is detected, according to the operating status of the control panel judged in the status judging step and the type of device abnormality detected in the abnormality detecting step; and
   reporting, the device abnormality detected in the abnormality detecting step in the reporting mode selected in the reporting mode selecting step.

12. A computer readable medium storing a program of instructions causing a computer to perform a process for reporting abnormality for an image processor that has a control panel having a display function and performs device operation and external access using the control panel, the process comprising:
   judging whether the operating status of the control panel is a device operating status or an external access status;
   detecting a device abnormality;
   selecting a reporting mode of a device abnormality by a reporting mode select unit when the device abnormality is detected, according to the judged operating status of the control panel and the type of the detected device abnormality; and
   reporting the detected device abnormality in the selected reporting mode.

13. A computer data signal embodied in a carrier wave for enabling a computer to perform a process for reporting abnormality for an image processor that has a control panel having a display function and performs device operation and external access using the control panel, the process comprising:
   judging whether the operating status of the control panel is a device operating status or an external access status;
   detecting a device abnormality;
   selecting a reporting mode of a device abnormality by a reporting mode select unit when the device abnormality is detected, according to the judged operating status of the control panel and the type of the detected device abnormality; and
   reporting the detected device abnormality in the selected reporting mode.

* * * * *